United States Patent
Yu et al.

(10) Patent No.: US 11,894,782 B2
(45) Date of Patent: Feb. 6, 2024

(54) PULSE WIDTH MODULATION METHOD FOR CASCADED H-BRIDGE CONVERTER

(71) Applicant: SANTAK ELECTRONIC (SHENZHEN) CO., LTD., Shenzhen (CN)

(72) Inventors: Jianxiong Yu, Shanghai (CN); Jiajie Duan, Shanghai (CN); Qiang Chen, Shanghai (CN); Han Li, Shanghai (CN); Cheng Luo, Shanghai (CN)

(73) Assignee: SANTAK ELECTRONIC (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 17/932,062

(22) Filed: Sep. 14, 2022

(65) Prior Publication Data

US 2023/0077401 A1    Mar. 16, 2023

(30) Foreign Application Priority Data

Sep. 15, 2021    (CN) .......................... 202111080594.8

(51) Int. Cl.
*H02M 7/217*    (2006.01)
*H02M 7/493*    (2007.01)
(Continued)

(52) U.S. Cl.
CPC ......... *H02M 7/493* (2013.01); *H02M 1/0058* (2021.05); *H02M 1/325* (2021.05);
(Continued)

(58) Field of Classification Search
CPC .. H02M 1/0054; H02M 1/0058; H02M 1/007; H02M 1/0074; H02M 1/08;
(Continued)

(56) References Cited

U.S. PATENT DOCUMENTS

| | | | |
|---|---|---|---|
| 10,680,508 B2 * | 6/2020 | Wang | H02M 7/49 |
| 2014/0036557 A1 * | 2/2014 | Nondahl | H02M 1/12 363/71 |

(Continued)

FOREIGN PATENT DOCUMENTS

WO    WO-2013104418 A1 *    7/2013    ................ B60L 9/28

*Primary Examiner* — Thienvu V Tran
*Assistant Examiner* — Shahzeb K Ahmad
(74) *Attorney, Agent, or Firm* — Stanek Lemon Crouse & Meeks, P.A.

(57) ABSTRACT

The present invention provides a Pulse Width Modulation (PWM) method for a Cascaded H-bridge (CHB) converter. Each phase of the converter is provided with n Cascaded H-bridge rectifier circuits, or may also be provided with n Cascaded H-bridge rectifier circuits+1 redundant H-bridge rectifier circuit. The method includes following steps of: S1, generating groups of sinusoidal signals as reference waveforms, and generating n carrier signals having sequentially decreasing levels and equal amplitudes to correspond to the H-bridge rectifier circuit at the first to the $n^{th}$ levels, where the levels of the n carrier signals are cascaded to fill the voltage amplitude of a unipolar half cycle of the reference waveform; and S2, determining PWM signals for controlling power transistors of the corresponding H-bridge rectifier circuits based on each reference waveform and each carrier signal. According to the present invention, the CHB converter allows the MV grid to be directly coupled with a LV side without a conventional transformer, which reduces the heat loss and balances the distribution of heat loss between the power transistors and between the H-bridges at all levels, thus prolonging the service life.

14 Claims, 15 Drawing Sheets

(51) Int. Cl.
*H02M 7/00* (2006.01)
*H02M 1/00* (2006.01)
*H02M 1/32* (2007.01)
*H02M 7/483* (2007.01)
*H02M 7/5395* (2006.01)
*H02M 3/335* (2006.01)
*H02M 7/48* (2007.01)

(52) U.S. Cl.
CPC ........... *H02M 7/003* (2013.01); *H02M 7/217* (2013.01); *H02M 7/4835* (2021.05); *H02M 7/5395* (2013.01); *H02M 1/007* (2021.05); *H02M 1/0054* (2021.05); *H02M 1/327* (2021.05); *H02M 3/33573* (2021.05); *H02M 7/4807* (2013.01)

(58) Field of Classification Search
CPC ...... H02M 1/081; H02M 1/325; H02M 1/327; H02M 7/003; H02M 7/162; H02M 7/1623; H02M 7/21; H02M 7/217; H02M 7/219; H02M 7/4807; H02M 7/483; H02M 7/4835; H02M 7/5395; H02M 7/493; H02M 3/33573; H02M 5/4505
See application file for complete search history.

(56) References Cited

U.S. PATENT DOCUMENTS

| | | | | |
|---|---|---|---|---|
| 2018/0367021 A1* | 12/2018 | Mano | .................... | H02M 7/537 |
| 2019/0052177 A1* | 2/2019 | Lu | .......................... | H02M 7/797 |
| 2022/0416671 A1* | 12/2022 | Huang | .................. | H02M 1/007 |
| 2023/0006564 A1* | 1/2023 | Elsayad | .............. | H02M 1/0043 |

* cited by examiner

PULSE WIDTH MODULATION METHOD FOR CASCADED H-BRIDGE CONVERTER

CROSS-REFERENCE TO RELATED APPLICATIONS

The present application claims priority to Chinese Patent Application No. 202111080594.8 filed on Sep. 15, 2021, entitled A PULSE WIDTH MODULATION METHOD FOR CASCADED H-BRIDGE POWER CONVERTER, the disclosure of which is incorporated herein by reference in its entirety.

TECHNICAL FIELD

The present invention relates to the field of electronic circuits, in particular to a Pulse Width Modulation (PWM) method for a Cascaded H-bridge (CHB) converter.

BACKGROUND

Power conversion systems typically convert AC power received into internal DC power for subsequent conversion into AC power to be supplied to loads. Most of converters in the prior art are low voltage (LV) devices. For example, when applied to an Uninterrupted Power Supply (UPS), the converters cannot be connected directly but through a large transformer to a medium-voltage (MV) grid (such as Chinese standard 10 KV MV grids or American standard 13.8 KV/4.16 KV MV grids). A novel MV converter can be connected directly to MV grids through its AC/DC converter circuits, while allowing higher watt density and faster regulation speed, so it is more efficient and compact. A preferred structure of the MV converter is a Cascaded H-bridge (CHB) multi-level topology composed of a plurality of CHBs connected in series, which has many prominent advantages, such as multiple levels, excellent harmonic characteristics, and easy realization of high voltage and large capacity, and is very suitable for ultra-large scale power systems. However, compared with the service life (e.g., about 20 years) of conventional transformers to be replaced thereby, this novel MV converter needs to be further improved to have a longer service life, which makes it more competitive.

SUMMARY

In view of the above technical problems existing in the prior art, in a first aspect of the present invention, a Pulse Width Modulation (PWM) method for a Cascaded H-bridge (CHB) medium-voltage (MV) converter is provided. According to the method, each phase of the CHB MV converter connected to a three-phase AC power supply is provided with n Cascaded H-bridge rectifier circuits, where n is greater than 1, and each H-bridge rectifier circuit is provided with a first AC input terminal, a second AC input terminal, a positive DC output terminal, a negative DC output terminal, four power transistors connected to form a H-bridge structure, and a DC bus capacitor.

The PWM method adopted for the n H-bridge rectifier circuits in each phase includes following steps of:

S1: generating a pair of sinusoidal signals with a phase difference of 180 degrees as a first reference waveform and a second reference waveform, and generating n carrier signals having sequentially decreasing levels and equal amplitudes to correspond to the n H-bridge rectifier circuits respectively, where the levels of the n carrier signals are cascaded to fill the voltage amplitude of a unipolar half cycle of the reference waveform; and S2: determining PWM signals for controlling the corresponding H-bridge rectifier circuits based on the reference waveform and each of the n carrier signals, and controlling, by n groups of the PWM signals, the power transistors in the n H-bridge rectifier circuits to switch on and off.

Preferably, each H-bridge rectifier circuit includes a first leg formed by connecting the power transistors T1 and T2 in series, and a second leg formed by connecting the power transistors T3 and T4 in series, where a node formed between the power transistors T1 and T2 is connected to the first AC input terminal of the H-bridge rectifier circuit, and a node formed between the power transistors T3 and T4 is connected to the second AC input terminal of the H-bridge rectifier circuit. The first leg, the second leg and the DC bus capacitor are connected in parallel between the positive DC output terminal and the negative DC output terminal of the H-bridge rectifier circuit.

Preferably, the S1 includes following steps of:
generating PWM signals for controlling the power transistors T1 and T2 based on the first reference waveform, and generating PWM signals for controlling the power transistors T3 and T4 based on the second reference waveform, wherein
the PWM signals of the power transistors T1 and T2 are complementary, and the PWM signals of power transistors T3 and T4 are complementary.

Preferably, the S2 includes following steps of:
keeping the PWM signals for controlling the power transistors T1 and T3 at high levels, and keeping the PWM signals for controlling the power transistors T2 and T4 at low levels when the first reference waveform is located in the unipolar half cycle and the power transistors T1, T2, T3 and T4 are all in the non-PWM time periods.

Preferably, the PWM signals generated by different carrier signals in the n carrier signals are used in turn to preform PWM on each of the n H-bridge rectifier circuits.

Preferably, each phase of the CHB MV converter is provided with n+m H-bridge rectifier circuits, where the n H-bridge rectifier circuits are used for rectification, the m H-bridge rectifier circuits are used as redundancy levels, and n and m are greater than 1. Each H-bridge rectifier circuit is provided with a first AC input terminal, a second AC input terminal, a positive DC output terminal, a negative DC output terminal, four power transistors connected to form a H-bridge structure, and a DC bus capacitor.

The PWM method adopted for the n+m H-bridge rectifier circuits in each phase includes following steps of:

S1: generating a pair of sinusoidal signals with a phase difference of 180 degrees as a first reference waveform and a second reference waveform, and generating n+m carrier signals having sequentially decreasing levels and equal amplitudes, where the n carrier signals with the highest levels correspond to the n H-bridge rectifier circuits respectively, and the levels of the n+m carrier signals are cascaded to fill the voltage amplitude throughout the entire cycle of the reference waveform; and S2: determining PWM signals for controlling the corresponding H-bridge rectifier circuits based on the reference waveform and each of the n carrier signals, and controlling, by n groups of the PWM signals, the power transistors in the n H-bridge rectifier circuits to switch on and off.

Preferably, as an alternative, the levels of the n+m carrier signals are cascaded to fill the voltage amplitude of the unipolar half cycle of the reference waveform in the step of S1.

Preferably, each H-bridge rectifier circuit includes a first leg formed by connecting the power transistors T1 and T2 in series, and a second leg formed by connecting the power transistors T3 and T4 in series, where a node formed between the power transistors T1 and T2 is connected to the first AC input terminal of the H-bridge rectifier circuit, and a node formed between the power transistors T3 and T4 is connected to the second AC input terminal of the H-bridge rectifier circuit. The first leg, the second leg and the DC bus capacitor are connected in parallel between the positive DC output terminal and the negative DC output terminal of the H-bridge rectifier circuit; and a by-pass switch is provided between the first AC input terminal and the second AC input terminal of each H-bridge rectifier circuit.

Preferably, each by-pass switch is a TRIAC. The PWM method further includes a step of:

when the power transistors T1, T2, T3 and T4 of at least one of the H-bridge rectifier circuits are in the non-PWM time periods at the same time, and alternating currents flowing through the power transistors T2 and T4 are in time periods during which the amplitude monotonically decreases to zero, controlling the TRIAC of each H-bridge rectifier circuit to be switched on to bypass the H-bridge rectifier circuit.

Preferably, the by-pass switches are two Insulated Gate Bipolar Translators (IGBT) connected in inverse parallel. The PWM method further includes a step of:

when the power transistors T1, T2, T3 and T4 of at least one of the H-bridge rectifier circuits are in the non-PWM time periods at the same time, controlling the two IGBTs connected in inverse parallel to be switched on to bypass the H-bridge rectifier circuit.

Preferably, the PWM signals generated by different carrier signals in the n carrier signals with the highest level are used in turn to preform PWM on each of the n H-bridge rectifier circuits.

Preferably, the power transistors are N-channel Metal Oxide Semiconductor Field-Effect Transistors (MOSFET) or IGBTs connected in inverse parallel with diodes.

In a second aspect of the present invention, a Cascaded H-bridge (CHB) MV converter for connection to a three-phase AC power supply is provided. Each phase of the CHB MV converter is provided with n Cascaded H-bridge rectifier circuits, and DC/DC converter circuits and DC/AC inverter circuits corresponding to outputs of each H-bridge rectifier circuit, where each H-bridge rectifier circuit is provided with a first AC input terminal, a second AC input terminal, a positive DC output terminal and a negative DC output terminal, four power transistors connected to form a H-bridge structure, and a DC bus capacitor.

The CHB MV converter further includes a control module which controls the power transistors of at least one of the H-bridge rectifier circuits to switch on and off by the PWM method according to one of claims 1 to 12.

Preferably, in the CHB MV converter, an input terminal of each DC/DC converter is connected to the positive DC output terminal and the negative DC output terminal of each CHB rectifier circuit, and each DC/DC converter is an isolated DC/DC circuit which includes a primary side of the DC converters (DCC) and a secondary side of the DCC which are isolated by a transformer.

According to the present invention, the CHB MV converter allows the MV grid to be directly coupled with a LV side without a conventional transformer, which reduces the heat loss and balances the distribution of heat loss between the power transistors and between the H-bridges at all levels, thus prolonging the service life.

BRIEF DESCRIPTION OF DRAWINGS

Embodiments of the present invention are further described below with reference to the accompanying drawings.

DETAILED DESCRIPTION

In order to make the objective, technical schemes and advantages of the present invention clearer, the present invention will be further described in detail below with reference to the accompanying drawings by embodiments.

Figure 1:
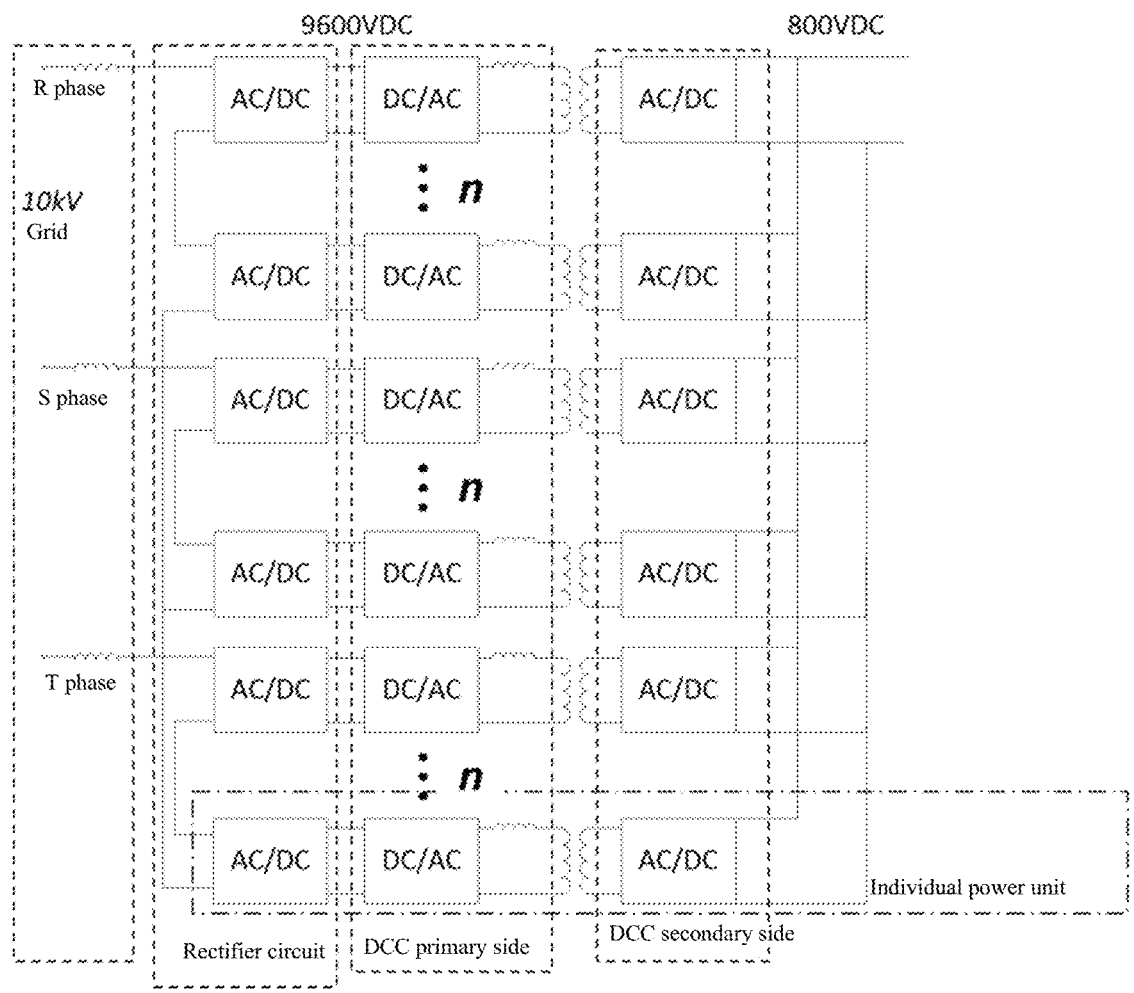
FIG. 1 shows a connection diagram between a cascaded H-bridge (CHB) medium-voltage (MV) converter and three-phase mains supply according to a preferred embodiment of the present invention.

FIG. 1 shows a connection diagram between a Cascaded H-bridge (CHB) medium-voltage (MV) converter and three-phase mains supply according to a preferred embodiment of the present invention.

The CHB MV converter mainly includes filter circuits configured to receive AC power from an MV grid, CHB rectifier circuits, DC/DC converter circuits and DC/AC inverter circuits. The DC/DC converter circuits of the CHB MV converter as shown are isolated DC/DC converter circuits, including a primary side and a secondary side of DC converters (DCC) isolated by a transformer. Low-voltage direct current (LVDC) buses on the secondary side of the DCC transmit LVDC power to the DC/AC inverter circuits, so as to allow inverted output of low-voltage alternating current (LVAC) power and supply the power to loads. As shown in FIG. 1, each of three phases of the CHB MV converter includes n cascaded power units, where n is an integer greater than 1, such as 3, 5, 8, 15 or even greater. FIG. 1 shows one of the individual power units. As those of skill in the art know, in order to show a circuit connection relationship of the present invention more clearly, circuit modules such as the DC/AC inverter circuits, loads, control devices, and detection devices configured to detect voltage are not shown in FIG. 1.

Embodiment One

Figure 2:
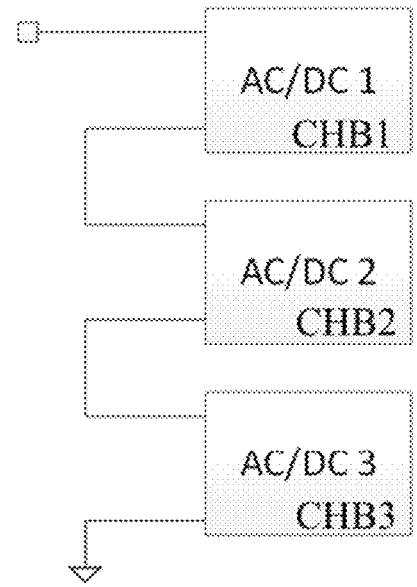
FIG. 2 shows a schematic diagram of a CHB rectifier circuit in FIG. 1 according to an specific embodiment.

FIG. 2 shows a schematic diagram of the CHB rectifier circuit in FIG. 1 according to an embodiment. The CHB rectifier circuit is specifically connected to one phase of a three-phase circuit. For the sake of brief explanation, the CHB rectifier circuit is composed of three H-bridges, namely CHB1, CHB2 and CHB3, each of which includes two AC input terminals configured to successively connect the CHB1, the CHB2 and the CHB3 in series between a single-phase AC power supply and a Neutral.

Figure 3:
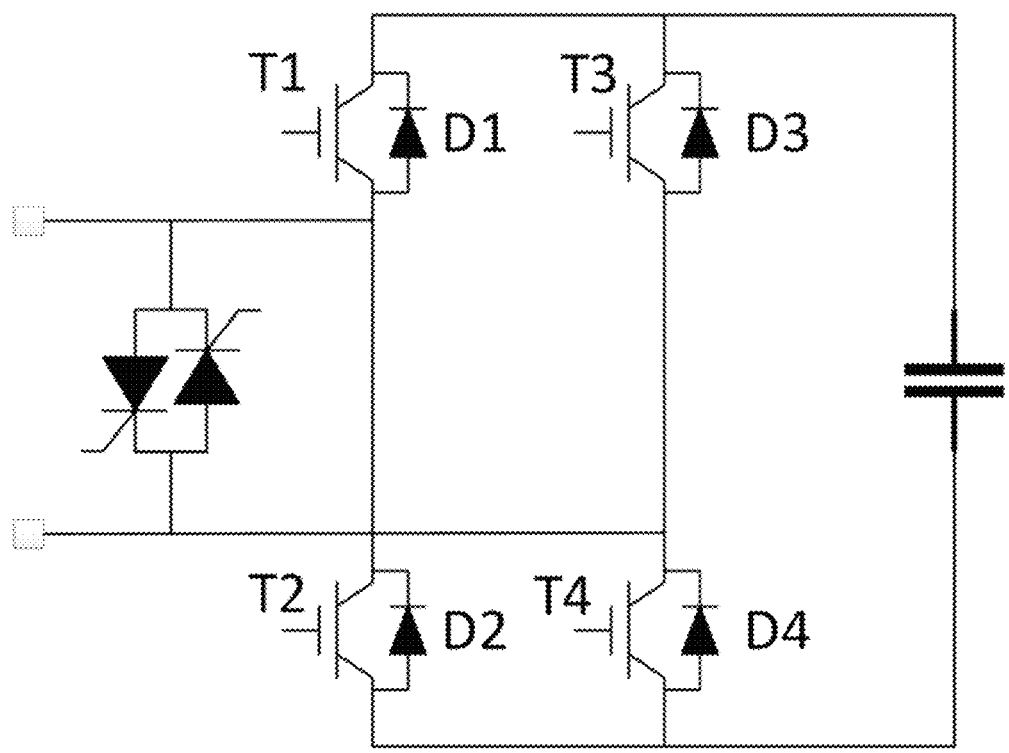
FIG. 3 shows an internal structure of each CHB in the CHB rectifier circuit in FIG. 2.

FIG. 3 shows an internal structure of each H-bridge in the CHB rectifier circuit in FIG. 2. As shown in FIG. 3, each H-bridge includes four power transistors. In this embodiment, the four power transistors include Insulated Gate Bipolar Transistors T1 to T4 connected in inverse parallel with diodes D1 to D4, respectively. The power transistors T1 and T2 are connected in series to form a first leg, and the power transistors T3 and T4 are connected in series to form a second leg. A node formed by the connection of an emitter of the power transistor T1 and a collector of the power transistor T2 is connected to a first AC input terminal 101 of the single-phase AC power supply, while a node formed by the connection of an emitter of the power transistor T3 and a collector of the power transistor T4 serves as a second AC input terminal 102 connected to an AC input terminal of the next-level H-bridge and to the Neutral of the last-level CHB. A TRIAC 103 for bypass control is connected in series between the first AC input terminal 101 and the second AC input terminal 102, and includes silicon-controlled rectifiers B1 and B2 connected in inverse parallel.

A collector of the power transistor T3 and an emitter of the power transistor T4 are connected to a positive DC bus 104 and a negative DC bus 105 as outputs of rectifier units, respectively. A DC bus capacitor 106 is connected between the positive DC bus and the negative DC bus. The first leg, the second leg and the DC bus capacitor 106 are connected in parallel.

For the CHB MV converter provided with a plurality of power thyristors (such as the power transistors T1 to T4), the inventor found that faults of the power thyristors account for about 40% of the total system faults, indicating that the emphasis should be placed on how to extend the service life of power thyristors when extending the entire life of the CHB MV converter as an improvement. The service life of power thyristors is mainly affected by temperature fluctuation, peak temperature, efficiency of heat cycle, and other factors which are directly related to the junction temperature of semiconductor chips of the power thyristors. The junction temperature of the chips depends on the losses of the chips mainly caused in the following two application scenarios: conduction loss occurs when the thyristors are switched on and energized, and switching loss occurs when the thyristors are controlled to be switched on and off. In the actual operating mode of the converter in the present invention, the chip of each power thyristor needs to operate in a PWM control mode for a long time, i.e., the thyristor needs to be switched on and off at high frequency, so the losses of the chips are mainly caused in the switching process. Therefore, the converter in the present invention is designed mainly to achieve lower switching loss in the PWM operating mode for a longer service life of the CHB MV converter.

Figure 4A:
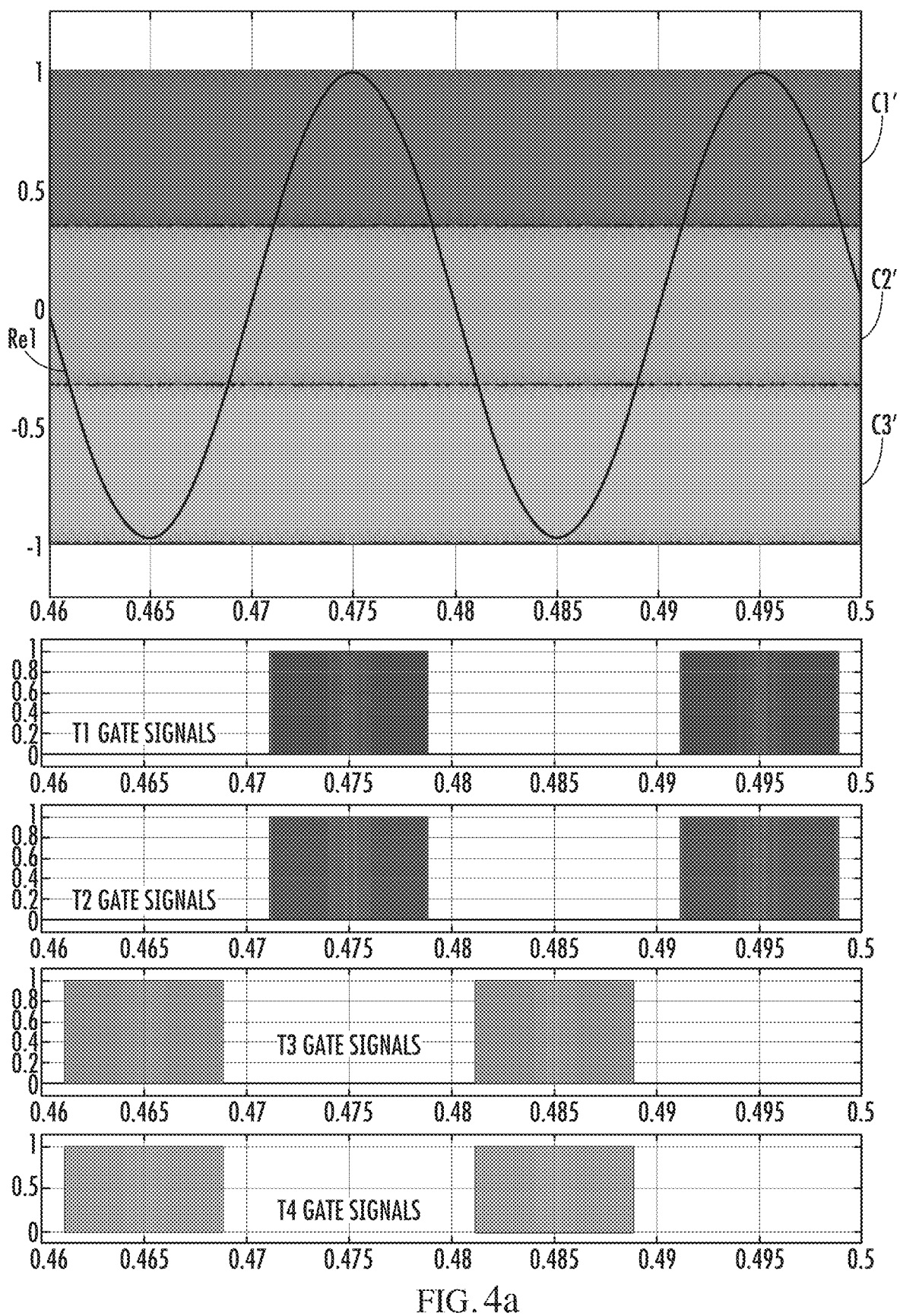
FIG. 4a shows a schematic diagram of a level-translation PWM waveform in the prior art applied to the CHB rectifier circuit in FIG. 3.

FIG. 4a shows a schematic diagram of a level-translation PWM waveform in the prior art applied to the CHB rectifier circuit in FIG. 3. A carrier C1', a carrier C2' and a carrier C3' (all of which are triangular carriers with high cascaded density) are configured to generate control signals for controlling the switch on/off of the power transistors in the CHB1, the CHB2 and the CHB3, respectively. For any one of the three CHBs, FIG. 4a shows a sinusoidal modulation signal with a phase of 180 degrees (taking the origin of a left coordinate axis as a zero reference point) as a reference waveform Ref1 of the power transistors T1 and T2, while a reference waveform Ref2 of the power transistors T3 and T4 is a sinusoidal wave with a phase of zero (not shown in FIG. 4a), provided that the relative difference between the two phases is 180 degrees. In the structure of each H-bridge, the two power transistors on the same leg should be protected from being switched on simultaneously. For example, the simultaneous switch-on of the power transistors T1 and T2 or that of the power transistors T3 and T4 shall be avoided. Therefore, as shown in FIG. 4a, gate signals for controlling the power transistors T1 and T2 remain reverse or complementary, and the same is true for other two power transistors on the same leg. It can be seen that the carriers in the prior art include both unipolar carriers and bipolar carriers, and PWM control signals applied to gates of the power transistors T1 to T4 need to operate for a long time, thus undoubtedly aggravating the switching loss of each power transistor due to high switching frequency.

Figure 4B:
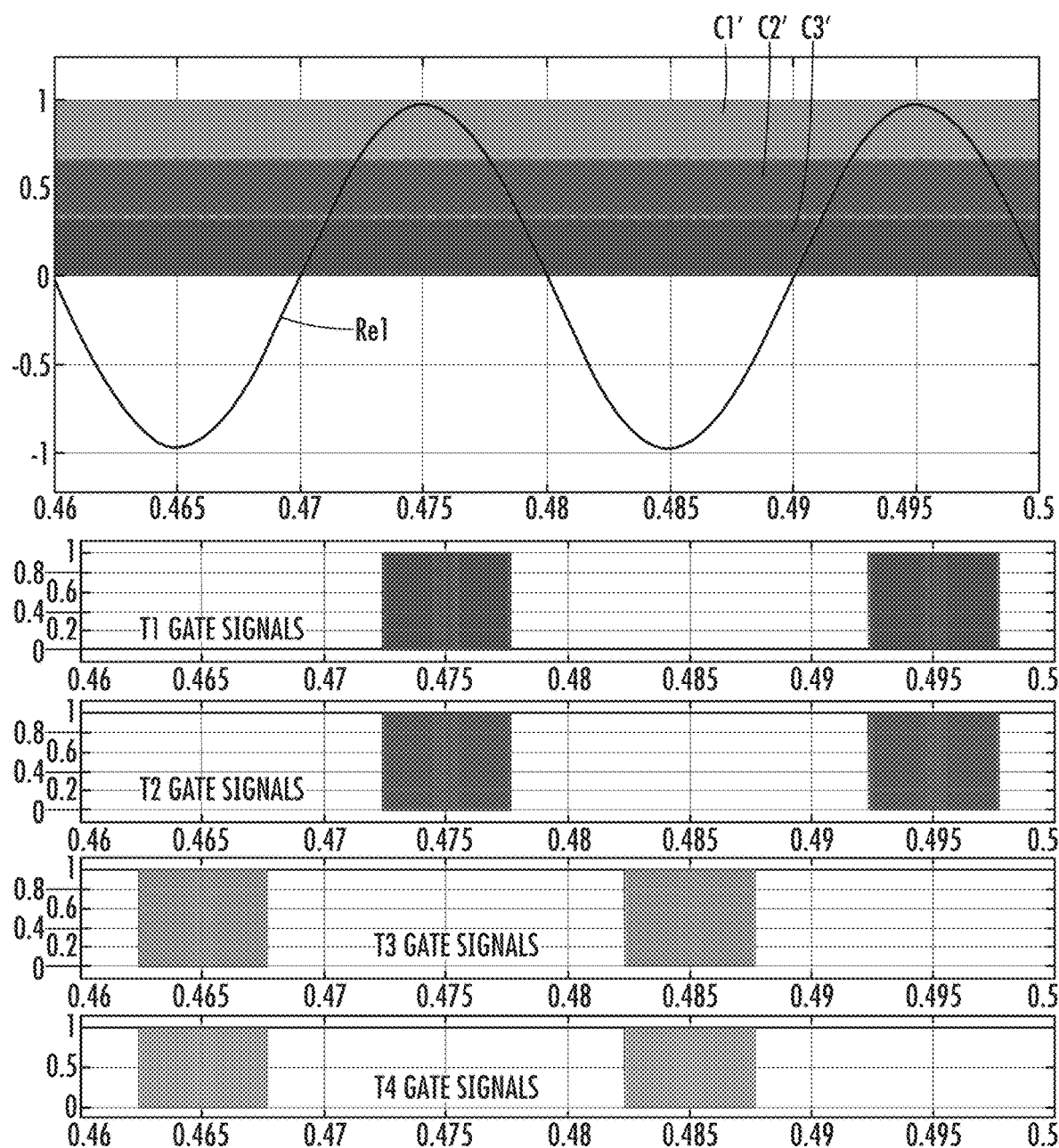
FIG. 4b shows a schematic diagram of a level-shifted level-translation PWM waveform applied to the CHB rectifier circuit according to a first embodiment of the present invention.

FIG. 4b shows a schematic diagram of a level-shifted level-translation PWM waveform applied to the CHB rectifier circuit according to Embodiment One of the present invention. The reference waveform Ref1 configured to generate signals for controlling the gates of the power transistors T1 and T2 (and the reference waveform Ref2 (not shown) configured to generate signals for controlling the gates of the power transistors T3 and T4) are consistent with the reference waveforms in the prior art in FIG. 4a, but the levels of a carrier C1, a carrier C2 and a carrier C3 generated (all of which are triangular carriers with high cascaded density and also positive unipolar carriers) are all shifted up to one third of a positive voltage half cycle of the reference waveform Ref1. The level of the carrier C1 corresponding to the first-level H-bridge CHB1 occupies one-third of the top of the positive voltage half cycle of the reference waveform, and the levels of the carriers C2 and C3 of the second-level H-bridge CHB2 and the third-level H-bridge CHB3 are successively cascaded down to zero level, thus filling the entire positive voltage half cycle of the reference waveform Ref1. After a carrier signal and a reference waveform signal are determined, the principle of generating PWM signals is known in the art. For example, the PWM signal outputs a high level when the reference waveform Ref1 is larger than the carrier signal, and outputs a low level when the reference waveform Ref1 is smaller than the carrier signal, which will not be described herein.

The inventor found that as the levels of the carriers of the CHB rectifier circuit according to various embodiments of the present invention are shifted up, the PWM working duration of the PWM signals applied to the gates of the power transistors T1 to T4 are reduced while the duration of operations other than PWM (or non-PWM working time, i.e., time periods during which the control signals to the gates of the power transistors remains 0 or 1) are increased. At the same time, the cascade structure of CHBs at all levels ensures a joint output of DC waveforms to DC buses.

FIG. 4b shows a waveform of control signals to the gates of the power transistors T1 to T4. Comparison of FIGS. 4a and 4b shows that the PWM time of each power transistor in FIG. 4b is reduced compared with that in FIG. 4a on the left, so the switching frequency and loss of the power transistors are reduced, and the entire service life of the chip is extended as its junction temperature decreases by less heat dissipation.

In addition, in this embodiment, it is also possible to generate PWM signals in a negative voltage half cycle when the reference waveforms and the carriers and those in the above example are arranged symmetrically with respect to the X-axis, which operate in a manner similar to that described above, so that the carrier signals in this embodiment only need to be cascaded to fill one of the unipolar half cycles of the reference waveform.

Figure 5A:
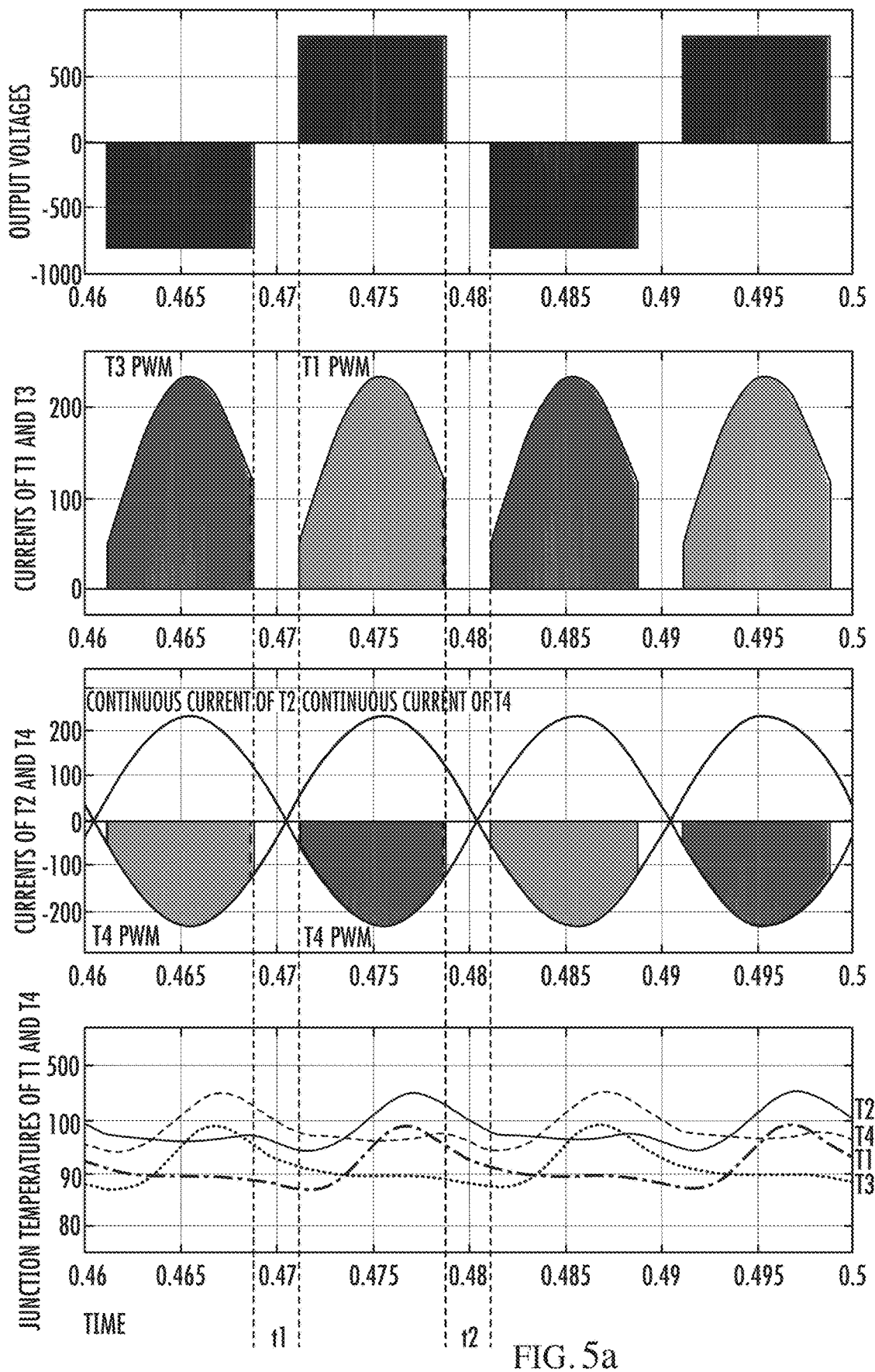
FIGS. 5a and 5b show variation curves of output voltages of a CHB1 controlled by the PWM waveforms shown in FIGS. 4a and 4b, and currents and junction temperatures of T1 to T4 on the CHB1, respectively.
Figure 5B:
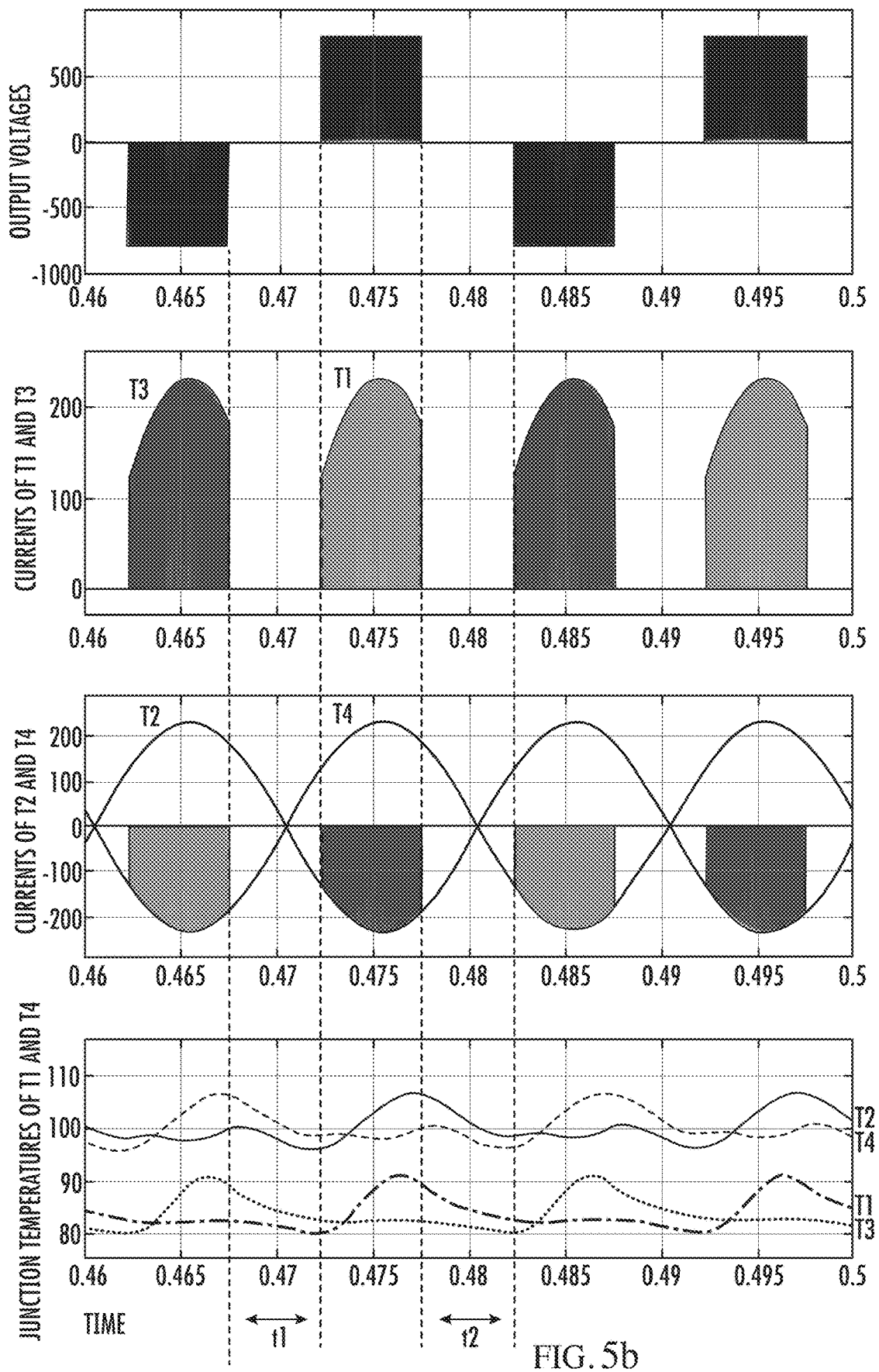

FIGS. 5a and 5b show variation curves of output voltages of a CHB1 controlled by the PWM waveforms shown in FIGS. 4a and 4b, and currents and junction temperatures of the power transistors T1 to T4 on the CHB1, respectively. Comparison of the two figures shows that the PWM duration corresponding to PWM current waveforms of the power transistors T1 to T4 improved in this embodiment shown in FIG. 5b is reduced, while the non-PWM duration, such as t1 and t2, corresponding to the continuous current increase, provided that the output voltages remain consistent. Specifically, for example, a pulse waveform (i.e., a first peak shape in a time period between 0.46 and 0.47, in which a large number of elongated rectangular waveforms with different heights generated by PWM are densely packed) of chopping current generated by the power transistor T3 in a first PWM process shown in FIG. 5a occupies far more than half of a time period between 0.46 and 0.47 on the X-axis, while a first pulse waveform passing through the power transistor T3 shown in FIG. 5b occupies only about half or less of an area between 0.46 and 0.47 on the X-axis, indicating that the PWM time is significantly shortened. Similar characteristics can also be found on the power transistor T2 and T4.

Temperature measurement results show that the junction temperatures of the power transistors T1 and T3 of the CHB1 are reduced most significantly, while those of the power transistors T2 and T4 are also reduced to some extent, as shown in FIG. 5b. In addition, in order to balance the heat generated by the three CHBs in operation, the carriers at different levels in the level-shifted level-translation PWM waveform shown in FIG. 4b can alternately serve as the gate control waveforms of the power transistors of the CHB1, the CHB2 and the CHB3 (e.g., used alternately with the PWM waveform shown in FIG. 4a), so that the PWM time of the power transistors of the three CHBs is almost equally shortened, and the heat, switching loss and conduction loss of each of the power transistors of the three CHBs tend to be same. In addition, although the level-translation PWM waveform in the prior art has a better harmonic distortion rate (THDi) than the level-shifted level-translation PWM waveform, the cascade structure of CHBs at all levels adopted according to all embodiments of the present invention is provided with a plurality of power units (3 in Embodiment One) for output, and the total harmonic distortion rate after the CHBs are cascaded in a real MV grid is sufficiently low, which is smaller than the level-translation PWM waveform in the prior art shown in FIG. 4a.

In this embodiment, the cascade structure of only three CHBs is taken an example, while in practice, there are usually more, for example, n CHB rectifier circuits, similar to those in FIG. 4b. The levels of the n triangular carriers corresponding to the first to $n^{th}$ H-bridge rectifier circuits are successively cascaded down to zero level from the maximum amplitude of the positive half cycle of the reference waveform, so the amplitude of each triangular carrier is 1/n of the maximum amplitude of the positive half cycle of the reference waveform.

Embodiment Two

According to Embodiment Two of the present invention, a CHB MV converter is exemplarily provided, which can further reduce the junction temperature of each power transistor on the three CHBs based on Embodiment One. The circuit structure of the CHB MV converter is similar to that in Embodiment One (as shown in FIGS. 2 and 3).

The inventor found that, in Embodiment One, the temperatures of the four power transistors on each CHB are not equally reduced no matter the three CHBs are controlled by the level-shifted level-translation PWM waveform in the prior art (as shown in FIG. 4a) or by the improved level-shifted PWM waveform (as shown in FIG. 4b). Although the temperature of the power transistors T1 and T3 in the power transistors T1 to T4 as shown in FIG. 5b is significantly reduced, the failure of any one of the power transistors due to heat loss will lead to the failure of the circuit (called Cask Effect) since all four power transistors need to operate normally, so it is necessary to ensure the equal temperature reduction of the power transistors T1 to T4 as far as possible for more balanced heat dissipation. In the reference waveform Ref1 shown in FIG. 4b, since the amplitude of the carrier C1 is squeezed to the top third area of the positive half cycle of the reference wave, when the reference value of the reference waveform Ref1 is lower than two thirds of its peak value, the amplitude of the carrier C1 is always larger than that of the reference waveform, and the gate signals of the power transistor T1 are always 0 while those of the power transistor T2 are always 1 accordingly. However, the amplitude change of the other reference waveform Ref2 configured to control the gates of the power transistors T3 and T4 is contrary to that of the Ref1 (the phase difference is 180 degrees), so when the reference value is lower than two thirds of its peak value, the amplitude of the carrier C1 is always larger than the reference waveform, and the output PWM signal controls the gate signals of the power transistor T3 to be always 0 and those of the power transistor T4 to be always 1. Therefore, when the power transistors T1 to T4 are all in the non-PWM time periods t1 and t2, the power transistors T2 and T4 are switched on while the power transistors T1 and T3 are switched off, so that the single-phase AC is input into the CHB1 and output to the next level, namely the CHB2, after flowing through the power transistors T2 and T4, and outputs zero level to the positive DC and negative buses 104 and 105 of the CHB1. In the PWM time period, when the power transistor T2 (T4) performs PWM to provide chopping current, the power transistor T4 (T2) is kept on to allow continuous current flow. It can be seen that the power transistors T2 and T4 need to suffer both the switching loss and the conduction loss since the power transistors T2 and T4 need to be switched on and off at high frequency and also need to allow continuous current flow within the PWM time, while the power transistors T1 and T3 do not need to suffer the switching loss since the power transistor T1 and T3 are both kept off in the non-PWM time periods. The unbalanced operating current burden of the power transistors T1 to T4 described above is the reason why the temperature reduction of the power transistors T1 and T3 is more significant than that of the power transistors T2 and T4.

According to this embodiment, for example, in the H-bridge structure shown in FIG. 3, the effect of transferring current from the single-phase AC power supply to the CHB2 by both the power transistors T2 and T4 in the non-PWM time periods is the same as that by both the power transistors T1 and T3. Based on the above analysis, in order to balance the temperature reduction of the power transistors T1 to T4, a level-shifted level-translation PWM waveform is provided in this embodiment, which can transfer continuous current to the CHB2 alternately by a combination of the power transistors T2 and T4 and a combination of the power transistors T1 and T3.

Figure 6:
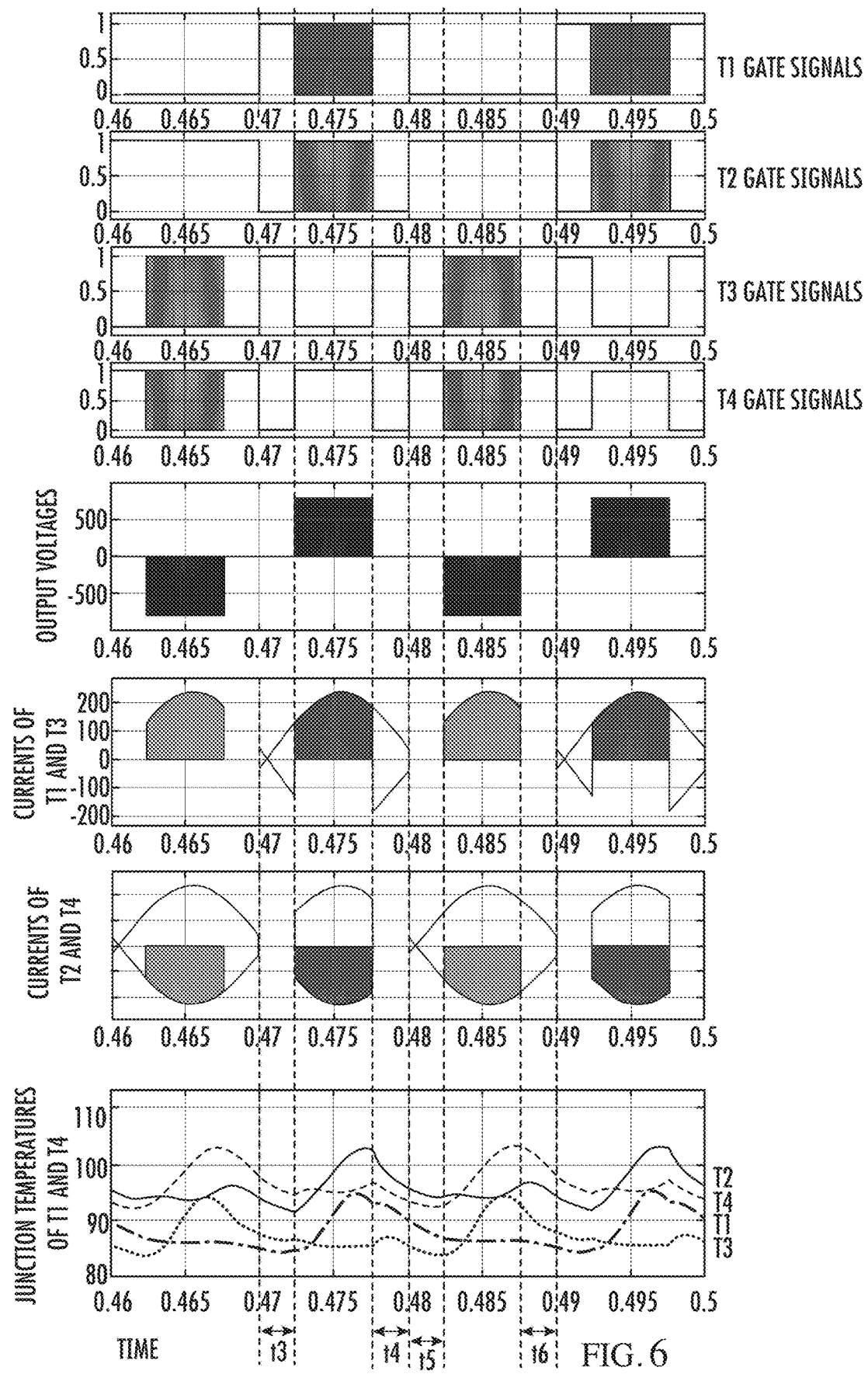
FIG. 6 shows an example of controlling the T1 to the T4 by a level-shifted level-translation PWM waveform and corresponding junction temperatures according to a second embodiment.

FIG. 6 shows an example of controlling the power transistors T1 to T4 by the level-shifted level-translation PWM waveform and corresponding junction temperatures according to this embodiment. Similar to Embodiment One, the levels of the C1, the C2 and the C3 (all of which are positive unipolar carriers) are all shifted up so that each occupies one third of the positive voltage half cycle of the reference waveform. Because the C1 is located in the top third area of the positive voltage half cycle of the reference waveform, the PWM time of the PWM signals generated by the C1 for controlling the gates of the power transistors T1 to T4 on one H-bridge, such as the CHB1, is significantly reduced, while the non-PWM time is significantly increased. In addition, when the reference waveform Ref1 is located in the positive half cycle, i.e., a half cycle in which the power transistor T1 is constantly off and the power transistor T2 is constantly on in the non-PWM time periods, the control process is as follows: in the time periods t3 and t4 (in the non-PWM time periods), the gate PWM signals output of the power transistor T1 are controlled to be 1 and the gate PWM signals of the power transistor T3 are controlled to be 1, so as to ensure that the power transistors T1 and T3 are synchronously switched on in such time periods. At the same time, the gate PWM signals output of the power transistor T2 are controlled to be 0 and the gate PWM signals of the power transistor T4 are controlled to be 0, so as to ensure that the power transistors T2 and T4 are switched off synchronously.

According to current waveforms of the power transistors T1 and T3 and those of the power transistors T2 and T4 in FIG. 6, the non-PWM time periods of the power transistors T1 to T4 are t3, t4, t5 and t6, where the continuous current of the single-phase AC power supply is transferred to the CHB2 through the power transistors T1 and T3 in the time periods t3 and t4, and transferred to the CHB2 through the power transistors T2 and T4 in the time periods t5 and t6, hence, on the premise that the output levels remains unchanged (as shown in FIG. 6), the continuous current of the power transistors T1 to T4 is more balanced than that in Embodiment One, and the conduction loss caused thereby is more evenly distributed among the four power transistors. According to junction temperature variation curves of the power transistors T1 to T4 measured in the experiment (as shown in FIG. 6), the junction temperatures of the power transistors T2 and T4 in this embodiment are lower than those in Embodiment One, and also lower than those in the prior art shown in FIG. 4a. Therefore, throughout the life cycle, the operating time of the four power transistors on the same H-bridge is more balanced and reasonable, and the heat loss is more even, which makes the four power transistors have similar service lives. Similar to Embodiment One, the improved PWM signals in this embodiment can be controlled to alternately control the gates of the power transistors on the CHB1, the CHB2 and the CHB3, so that the temperatures of the three CHBs are equally reduced. Therefore, the CHB MV converter shown in Embodiment Two has a longer service life than that in the prior art or that in Embodiment One, and the cascade structure has a better harmonic distortion rate.

Embodiment Three

According to Embodiment Three of the present invention, another CHB MV converter is exemplarily provided, which is designed to achieve a longer service life by redundant power units therein. The CHB MV converter with redundant power units may be similar to the converter shown in FIG. 1, but is provided with n+1 identical individual power units connected in series, where only n power units are in normal operation, and the remaining one is not involved in current conversion in this case. When one of the n power units fails, a remaining one is controlled to operate in place of the failed power unit (the failed power unit will be bypassed), so the remaining one is called redundant power unit. It should be understood by those of skill in the art that n+1 is merely a simple example, and there may be m redundancies depending on the vulnerability of the n power units in the circuit, where m is an integer greater than 1, such as n+2, n+3, and n+5, so the n units +1 redundancy may represent the n units +m redundancies. In the prior art, the redundant power unit among the n+1 power units is not involved in the current conversion when the main circuit is operating normally, and n carrier signals are applied only to the n power units. Therefore, the converter in this embodiment is designed to apply one carrier signal to the redundant CHB, so as to increase the number of cascaded carriers from n to n+1, so that if the CHB at each level, such as a first-level CHB31, corresponds exactly to a first carrier at the top of the cascaded n+1 carriers, the level amplitude of its carrier is expected to decrease, which causes a decrease in the overlap time between the carriers and the reference waveform and an increase in the non-PWM time periods of the PWM signals generated by the carriers.

Figure 7:
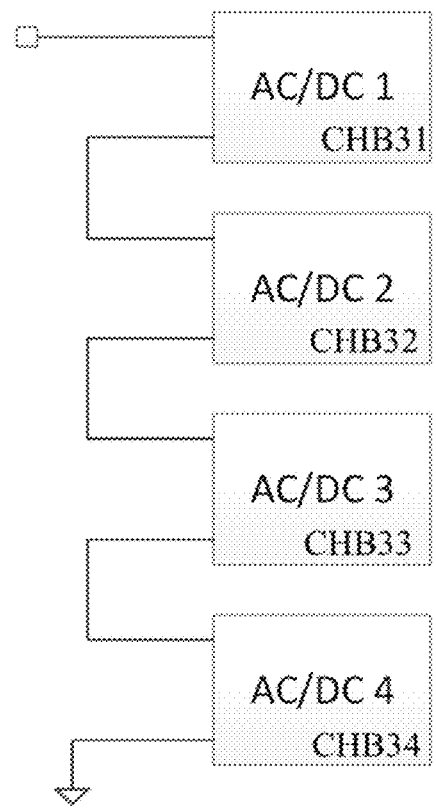
FIG. 7 shows a preferred embodiment of a CHB rectifier circuit of a 3+1 redundant CHB MV converter according to a third embodiment.

FIG. 7 exemplarily shows a preferred embodiment of a CHB rectifier circuit of a 3+1 redundant CHB MV converter. Basically, similar to that in FIG. 2, the CHB rectifier circuit is provided with four CHB structures, namely CHB31, CHB32, CHB33 and CHB34. The only difference between FIG. 7 and FIG. 2 is that the CHB34 is additionally provided in FIG. 7, where the CHB31, the CHB32 and the CHB33 are used for rectification, and the CHB34 is at the redundancy level, but the order is not limited. The redundant CHB34 and the first three CHBs are jointly controlled by PWM signals, but the CHB34 will not be switched on and off as it is bypassed in the normal operation of the system, so the output of the CHB34 does not serve as the output of the above CHB rectifier circuit, but serves only as a redundant backup.

An internal structure of each CHB in the CHB rectifier circuit shown in FIG. 7 is the same as that shown in FIG. 3 and will not be described herein.

Figure 8:
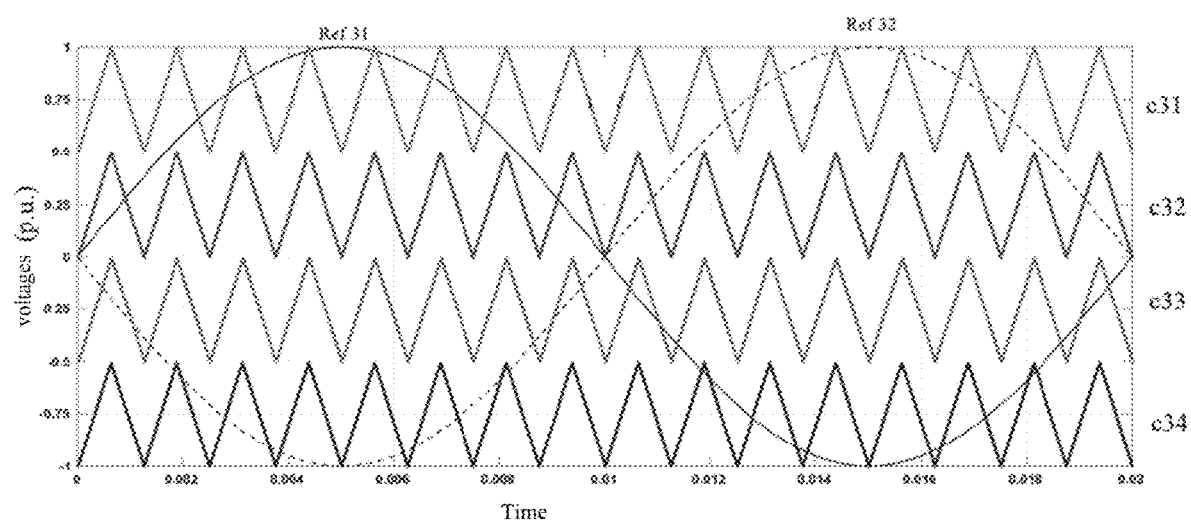
FIG. 8 exemplarily shows carriers configured to generate PWM signals for the H-bridge rectifier circuit shown in FIG. 7 and reference waveforms.

FIG. 8 exemplarily shows carriers configured to generate PWM signals for the CHB rectifier circuit shown in FIG. 7 and reference waveforms. Carriers C31, C32, C33 and C34 correspond to the CHB31, the CHB32, the CHB33 and the CHB34, respectively. Reference waveforms Ref31 and Ref32 are sinusoidal wave curves with phase difference of 180 degrees, of which Ref31 is configured to generate signals for controlling gates the power transistors T1 and T2, and Ref32 is configured to generate signals for controlling gates of the power transistors T3 and T4. The carriers shown in FIG. 8 are similar to the carriers in the prior art shown in FIG. 4a, both of which are high-frequency triangular carriers. FIG. 8 shows clearer details of the carriers on a smaller time scale. Through comparison of FIG. 8 and FIG. 4a, since the amplitudes of the carriers C1', C2' and C3' in FIG. 4a each occupies one third of the amplitude of the reference waveform Ref1 respectively, the PWM time of each of the power transistors T1 to T4 corresponds to the time period when the amplitude of the reference waveform Ref1 (or Ref2) is greater than two thirds of its peak value. In order to reduce the PWM time of the power transistors T1 to T4, the rectifier circuit in this embodiment is arranged in such a way that all four CHBs can be controlled by PWM signals. As shown in FIG. 8, the levels of the carriers C31, C32, C33 and C34 are cascaded in a descending order to fill the entire amplitude of the reference waveform Ref31, so the level amplitude of each carrier occupies a quarter of the total amplitude of the reference waveform Ref31. It can be seen that the overlap time between the carrier C31 of the first-level CHB31 and the reference waveform Ref1 (the PWM time of the power transistors T1 to T4) is reduced. The switching frequency of the power transistors T1 to T4 for PWM chopping are significantly reduced, so that the switching loss of the power transistors is reduced, the junction temperature on the chip is reduced, and the service life of the power transistors is extended. Moreover, the cascade structure has a better harmonic distortion rate.

Figure 9:
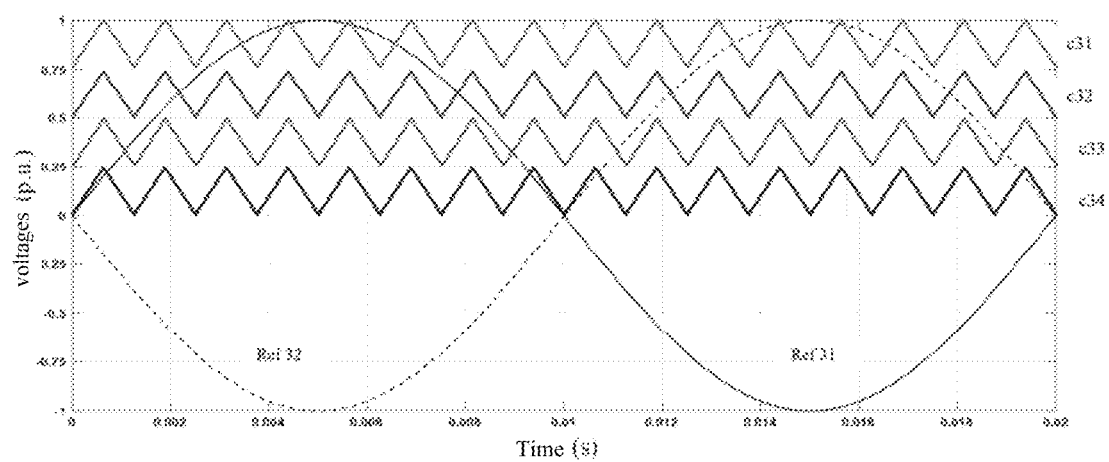
FIG. 9 exemplarily shows carriers configured to generate PWM signals for another variation of the third embodiment and reference waveforms.

FIG. 9 exemplarily shows carriers configured to generate PWM signals for another variation of Embodiment Three and reference waveforms. The levels of the carriers C31, C32, C33 and C34 are cascaded in a descending order to fill the positive half cycle of the reference waveform Ref31, and the level amplitude of each carrier occupies a quarter of the positive half cycle of the reference waveform Ref31, instead of a quarter of the entire amplitude of the reference waveform Ref31. In this case, the carriers C31, C32, C33 and C34 are all positive polarity carriers.

Figure 10:
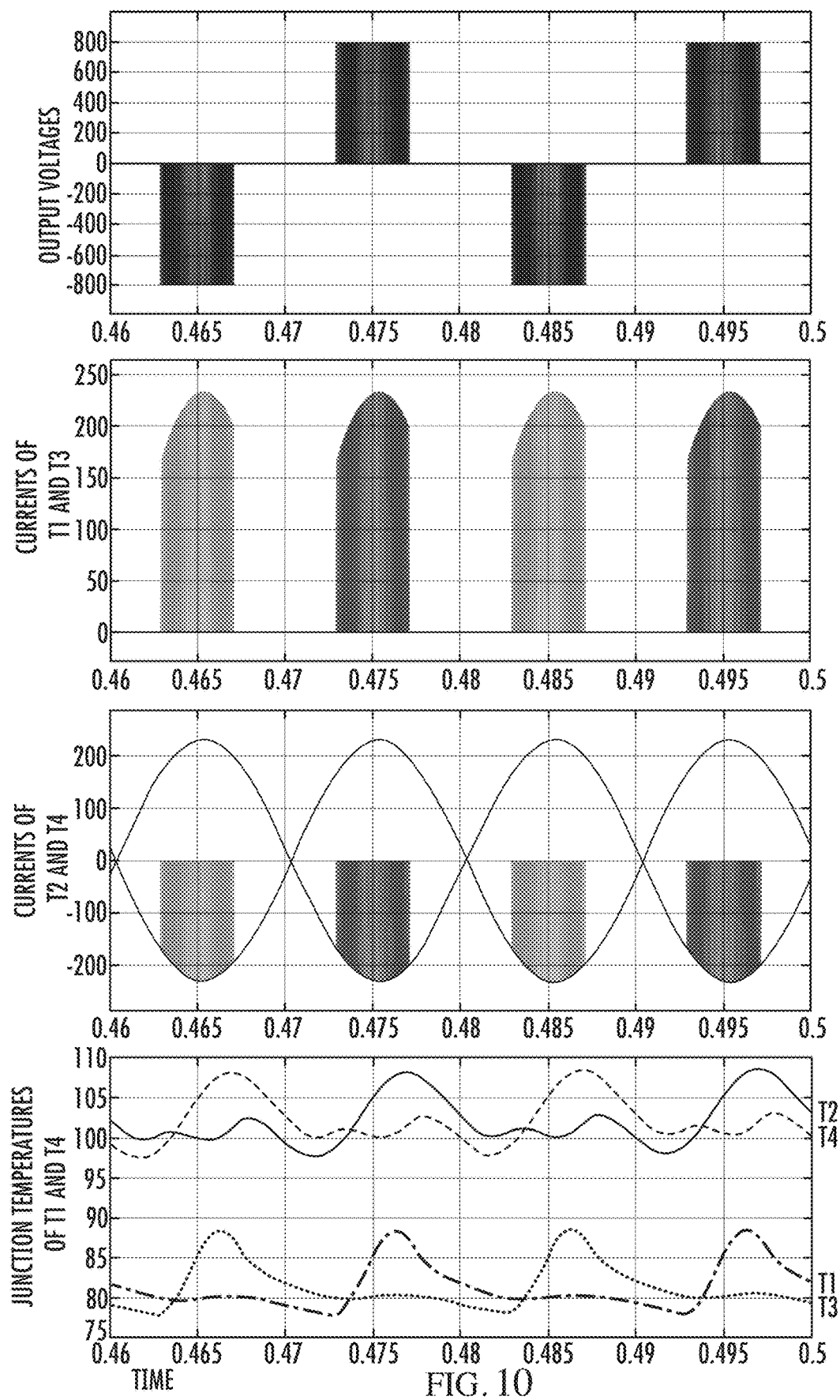
FIG. 10 shows variation curves of output voltages of a CHB3 controlled by the PWM signals generated by the carriers and the reference waveforms shown in FIG. 9, and currents and junction temperatures of the T1 to the T4.

FIG. 10 shows variation curves of output voltages of the CHB31 controlled by the PWM signals generated by the carriers and the reference waveforms shown in FIG. 9, and currents and junction temperatures of the power transistors T1 to T4. Comparing with the corresponding characteristics of Embodiment One shown in FIG. 5b, on the premise that the output levels are the same, the non-PWM time periods t7 and t8 of the power transistors T1 to T4 shown in FIG. 10 are longer than the non-PWM time periods t1 and t2 of the power transistors T1 to T4 in Embodiment One, and the switching loss of the power transistors T1 to T4 is lower.

Similar to Embodiment One or Embodiment Two, the PWM signals generated by the carriers at different levels in this embodiment can be controlled to alternately control the gates of the power transistors on the CHB1, the CHB2, the CHB3 and the CHB4, so that the temperature of the four CHBs are equally reduced.

Embodiment Four

As an example, a three-level cascaded rectifier circuit of the CHB MV converter in Embodiment One is still adopted in this embodiment, as shown in FIGS. 2 and 3. The TRIAC 103 is configured to bypass a failed H-bridge where it is located. When a H-bridge operates normally, the corresponding TRIAC 103 in the H-bridge is kept off, so its actual conduction time can be almost ignored during the entire life of the converter. However, the four power transistors T1 to T4 in the H-bridge structure need to carry chopping current generated by PWM and continuous current that transfers alternating current to the next level throughout their lifetime. Therefore, the rectifier circuit in this embodiment is designed to carry at least part of the continuous current originally carried by the four power transistors of the H-bridge structure through a by-pass switch block in the H-bridge circuit, so as to reduce the conduction loss of the four power transistors while transferring the alternating current to the next level.

Figure 11:
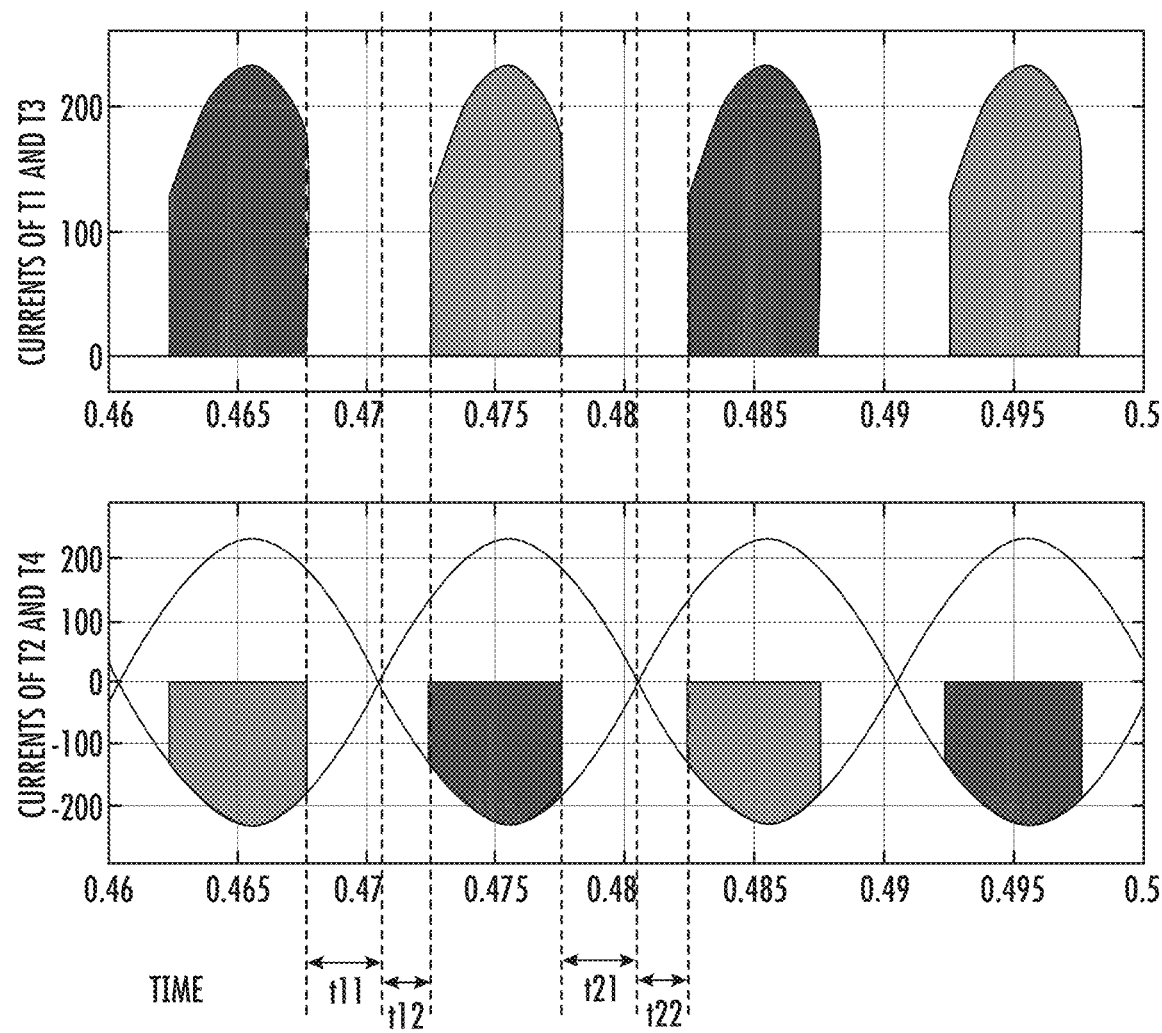
FIG. 11 shows current curves of the T1 to the T4 of the CHB1 controlled by the PWM waveforms according to the first embodiment of the present invention.

FIG. 11 shows current curves of the power transistors T1 to T4 of the first CHB1 controlled by the PWM waveforms according to Embodiment One of the present invention.

Figure 12:
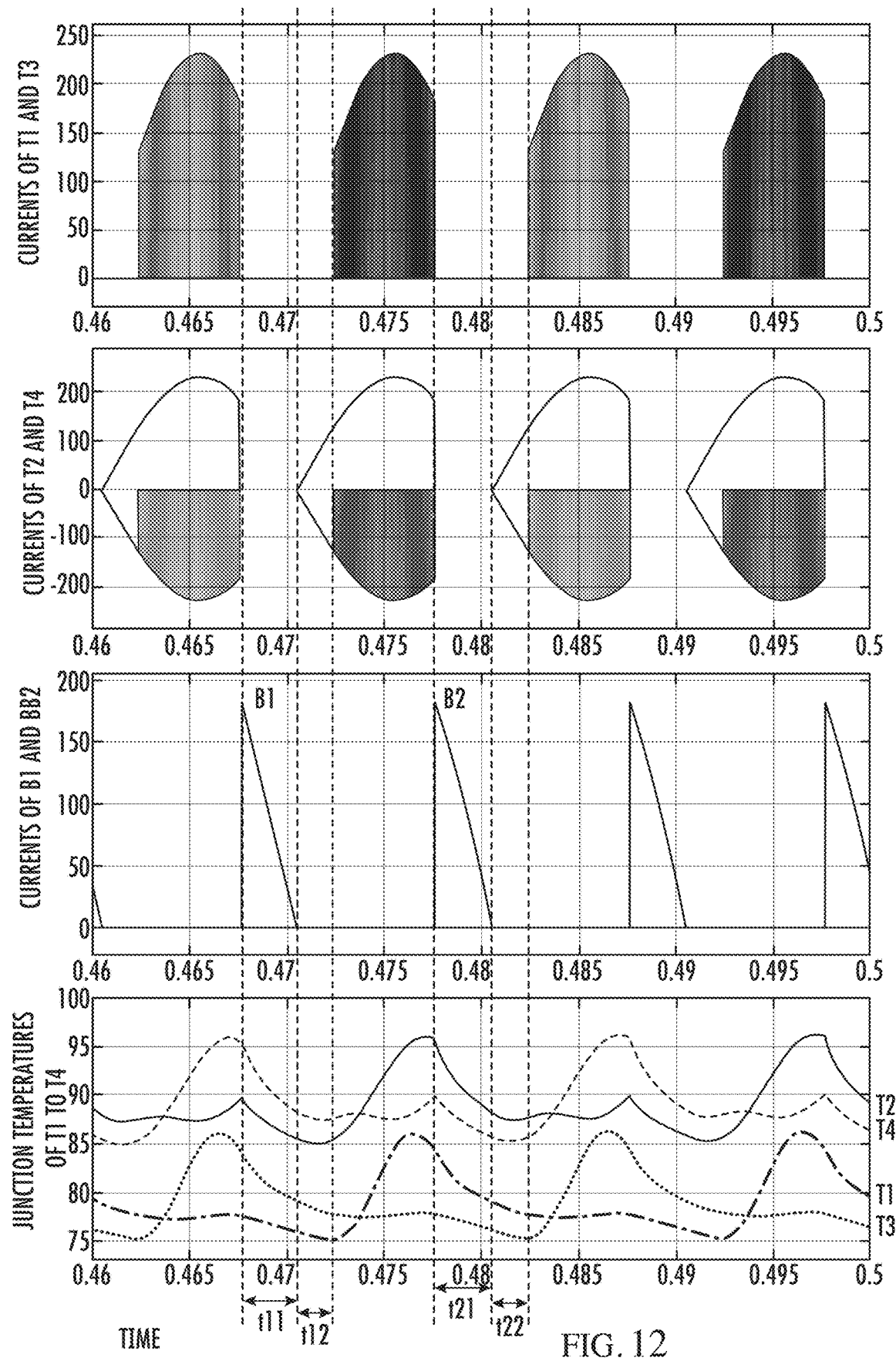
FIG. 12 shows current curves and junction temperature curves of the T1 to T4 of the CHB31 controlled by the PWM waveforms, and current curves of silicon-controlled rectifiers B1 and B2 according to a fourth embodiment of the present invention.

FIG. 12 shows current curves and junction temperature curves of the power transistors T1 to T4 of the CHB31 controlled by the PWM waveforms, and current curves of silicon-controlled rectifiers B1 and B2 according to Embodiment Four of the present invention.

FIG. 11 exemplarily shows part of the non-PWM time periods of the power transistors T1 to T4, namely t11, t12, t21 and t22 respectively, where the sum of t11 and t12 corresponds to t1 in FIG. 5b, and the sum of t21 and t22 corresponds to t2 in FIG. 5b. In each of the time periods t11, t12, t21 and t22, the current from the single-phase AC power supply is positively flow in to the CHB1, and the continuous current is input to the CHB2 through a circuit formed by the power transistors T2 and T4 which are switched on at the same time. The intensity of current flowing through the power transistors T2 and T4 gradually decreases to cross zero in the time period t11 or t21, while monotonically increasing from zero following the AC waveform in the time period t12 or t22. Since the silicon-controlled rectifiers B1 and B2 of the CHB1 to the CHB3 in this embodiment, once switched on, can be switched off only when the current flowing through the B1 and the B2 decreases to zero, the B1 and the B2 are not suitable for transferring the continuous current in place of the power transistors T2 and T4 during such time periods as t12 or t22. This is because the current flowing through the B1 and the B2 can never decrease to zero and the B1 and the B2 cannot be switched off during PWM operation to be performed after the time period t12 or t22, and the PWM operation will fail accordingly.

Therefore, a circuit control method is provided in this embodiment, which additionally provides a control method by the TRIAC 103 on the basis of the PWM method in Embodiment one. As shown in FIG. 12, the TRIAC 103 is switched on during the non-PWM time period t11 or t21 in which the current decreases and crosses zero. In the time period t11, the current flowing through the B1 is decreasing, the current flowing through the B2 is 0, and the current on the power transistors T2 and T4 is 0, i.e., the B1 transfers the continuous current to the next level in place of the power transistors T2 and T4 until the B1 is switched off as the current flowing through the B1 decreases to 0. In the time period t21, the current flowing through the B2 is decreasing, the current flowing through the B1 is 0, and the current on the power transistors T2 and T4 is 0 until the B1 is switched off as the current flowing through the B1 decreases to 0. In the above control process, the B1 or the B2 is responsible for transferring the continuous current from the single-phase AC power supply to the next level in place of the conductive path formed by the power transistors T2 and T4. Therefore, the conduction losses of the power transistors T2 and T4 in the CHB at each level are partially shared by the TRIAC 103, so that the service life of the CHB at each level is extended, and the cascade structure has a better harmonic distortion rate. Since the B1 or B2 in the TRIAC 103 operates only once in an AC cycle, there is no effect on the service life thereof.

In another variation of Embodiment Four, the circuit is provided with 3+1 redundant converters as shown in Embodiment Three, and the CHB rectifier circuit system shown in FIGS. 7 and 3. After using the carriers and reference waveforms shown in FIG. 9, the C31 corresponding to the CHB1 occupies more than three quarters of the amplitude of the positive half cycle of the reference waveform Ref31, and the non-PWM time of the four power transistors T1 to T4 on the CHB1 increases. Meanwhile, the TRIAC 103 bypasses the current to the next level during the time period that the power transistors T2 and T4 are switched on at the same time and the current waveform decreases to 0.

Figure 13:
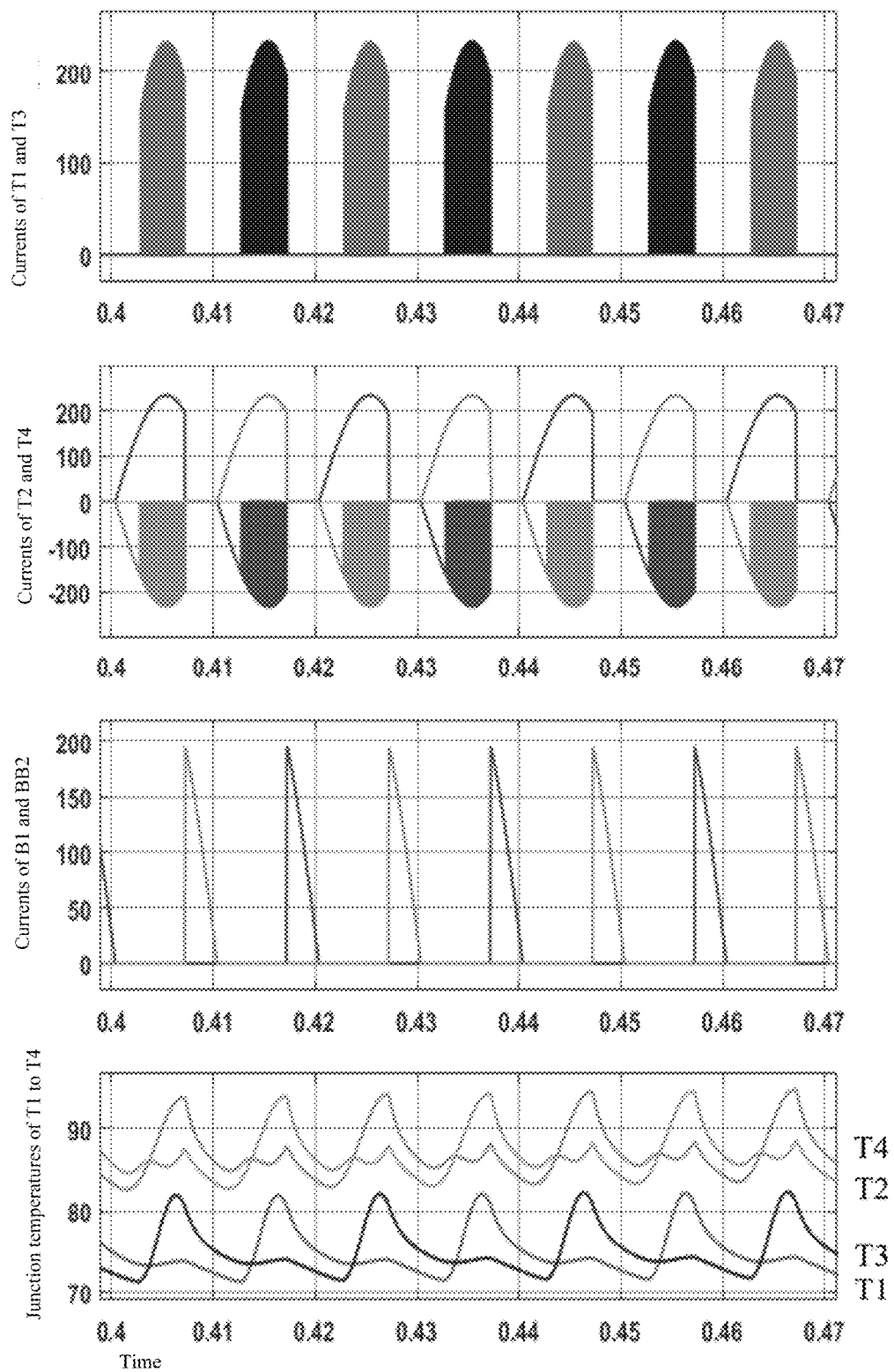
FIG. 13 shows current curves and junction temperature curves of the T1 to T4 of the CHB31 controlled by the PWM waveforms, and current curves of the silicon-controlled rectifiers B1 and B2 according to a variation of the fourth embodiment of the present invention.

FIG. 13 shows current curves and junction temperature curves of the power transistors T1 to T4 of the CHB31 controlled by the corresponding PWM waveforms, and current curves of the B1 and the B2 in this variation. It can be seen that the junction temperature on the chips of the power transistors T2 and T4 further decreases compared with the junction temperature curves in Embodiment Three. The cascade structure adopted in this embodiment has a better harmonic distortion rate.

Figure 14:
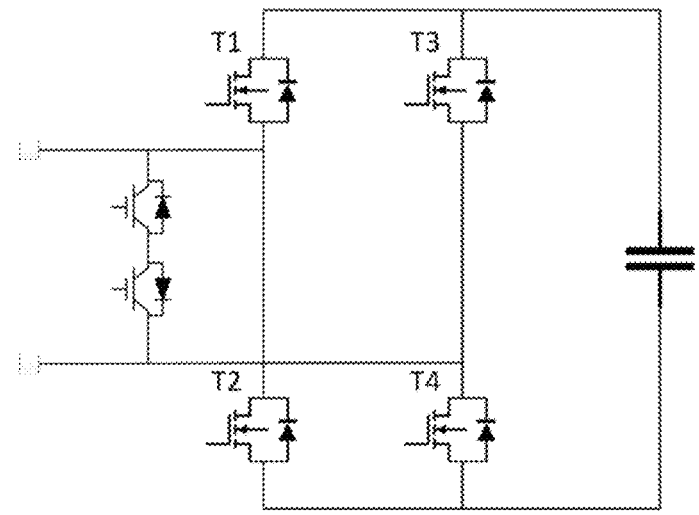
FIG. 14 shows a specific structure of one of the H-bridges according to another variation of the fourth embodiment.

FIG. 14 shows a specific structure of one of the CHBs in another variation of Embodiment 4. In this variation, two Insulated Gate Bipolar Transistors (IGBT) 401 and 402 connected in inverse parallel are adopted to replace the TRIAC 103 shown in FIG. 3. Since the IGBT does not need to consider the conditions of current flowing through it when it is switched off, the continuous current during the four time periods t11, t12, t21 and t22 can be bypassed by the IGBTs to the next level. Throughout the current cycle, there is no continuous current but only chopping current in the power transistors T2 and T4, and the conduction loss and junction temperatures are further reduced. In addition, in this embodiment, the power transistors T1 to T4 forming the CHB rectifier structure are four N-Channel Metal Oxide Semiconductor Field-Effect Transistors (MOSFET) connected in inverse parallel with fly-wheel diodes (FWD), in which a node formed by connecting a source of the power transistor T1 and a drain of the power transistor T2 serves as a first input terminal of the single-phase AC power supply, and a node formed by connecting a source of the power transistor T3 and a drain of the power transistor T4 serves as a second input terminal of the single-phase AC power supply, and a drain of the power transistor T3 and a source of the power transistor T4 are connected to positive DC and negative buses as DC outputs of the rectifier units. FIG. 14 is merely an example, and those of skill in the art will know that one or more of the power transistors T1 to T4 on one or more of the CHBs may be replaced with other power transistors T1 to T4 that allow PWM operation.

Figure 15:
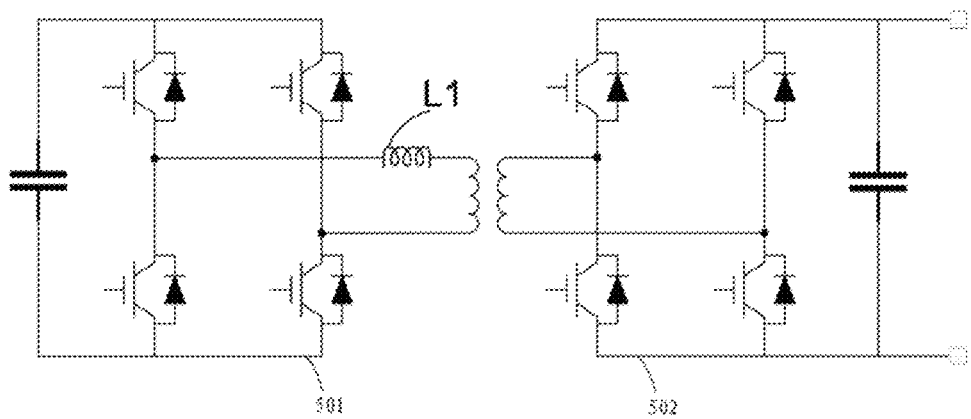
FIG. 15 shows a specific embodiment of an isolated DC/DC circuit configured to receive rectified outputs from one of the H-bridges in the converter shown in FIG. 1.

FIG. 15 shows a specific embodiment of an isolated DC/DC circuit configured to receive rectified outputs from one of the CHBs in the converter shown in FIG. 1. The isolated DC/DC circuit includes a primary side 501 of DC-AC converters and a secondary side 502 of AC-DC converters isolated by a transformer. The primary side 501 of the DC-AC converters includes an inductor L1 connected in series with an inductance coil of the transformer. The power transistors with the CHB structure on the primary side 501 and the secondary side 502 are IGBTs.

Figure 16:
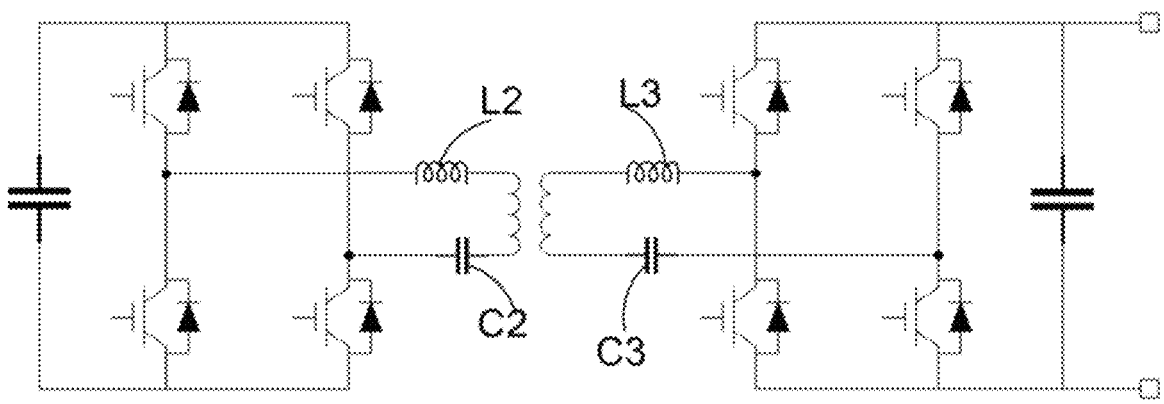
FIG. 16 shows a variation of the isolated DC/DC circuit shown in FIG. 15.

FIG. 16 shows a variation of the isolated DC/DC circuit shown in FIG. 15, which differs from the structure shown in FIG. 15 in that its primary side is provided with an inductor L2 and a capacitor C2 connected in series with the inductance coil of the transformer, and its secondary side is provided with an inductor L3 and a capacitor C3 connected in series with the inductance coil of the transformer.

Figure 17:
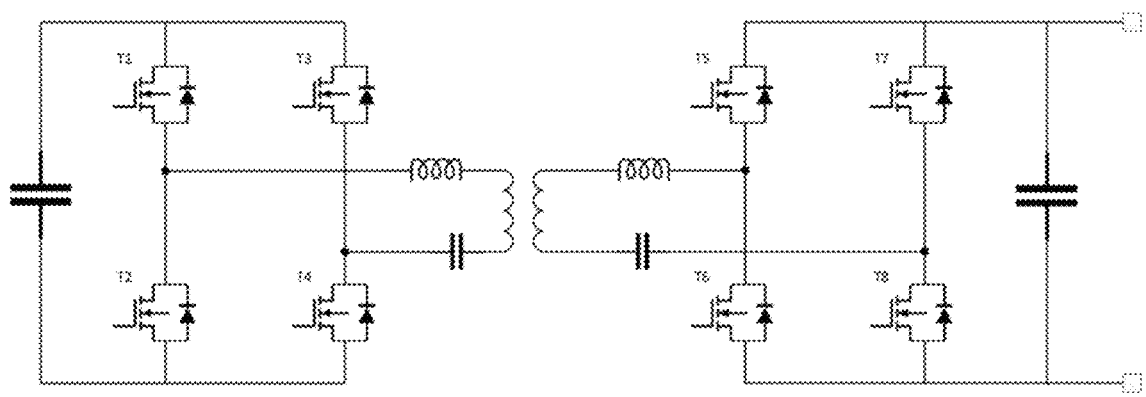
FIG. 17 shows another variation of the isolated DC/DC circuit shown in FIG. 16.

FIG. 17 shows a variation of the isolated DC/DC circuit shown in FIG. 16, which differs from the structure shown in FIG. 16 in that the power transistors T1 to T8 on the primary side and the secondary side are N-Channel MOSFETs.

Although the present invention has been described by preferred embodiments, the present invention is not limited to the embodiments described herein, but includes various modifications and variations made without departing from the scope of the present invention.

The invention claimed is:

1. A Pulse Width Modulation (PWM) method for a Cascaded H-bridge (CHB) converter, wherein each phase of the CHB converter connected to a three-phase AC power supply is provided with n CHB rectifier circuits, where n is greater than 1, and each CHB rectifier circuit is provided with a first AC input terminal, a second AC input terminal, a positive DC output terminal, a negative DC output terminal, four power transistors connected to form a H-bridge structure, and a DC bus capacitor, the PWM method comprising the steps of:
S1, generating a pair of sinusoidal signals with a phase difference of 180 degrees as a first reference waveform and a second reference waveform, and generating n carrier signals having sequentially decreasing levels and equal amplitudes to correspond to the n H-bridge rectifier circuits, respectively, wherein the levels of the n carrier signals are cascaded to fill the amplitude of a unipolar voltage half cycle of the reference waveform; and S2, determining PWM signals for controlling the corresponding H-bridge rectifier circuits based on each reference waveform and each of the n carrier signals, and controlling, by n groups of the PWM signals, the power transistors in the n H-bridge rectifier circuits to switch on and off.

2. The PWM method according to claim 1, wherein each H-bridge rectifier circuit comprises a first leg formed by connecting the power transistors T1 and T2 in series, and a second leg formed by connecting the power transistors T3 and T4 in series, wherein a node formed between the power transistors T1 and T2 is connected to the first AC input terminal of the H-bridge rectifier circuit, and a node formed between the power transistors T3 and T4 is connected to the second AC input terminal of the H-bridge rectifier circuit, and the first leg, the second leg and the DC bus capacitor are connected in parallel between the positive DC output terminal and the negative DC output terminal of the H-bridge rectifier circuit.

3. The PWM method according to claim 2, wherein the step S1 comprises following steps of:
generating PWM signals for controlling the power transistors T1 and T2 based on the first reference waveform, and generating PWM signals for controlling the power transistors T3 and T4 based on the second reference waveform, wherein
the PWM signals of the power transistors T1 and T2 are complementary, and the PWM signals of power transistors T3 and T4 are complementary.

4. The PWM method according to claim 3, wherein the step S2 comprises following steps of:
keeping the PWM signals for controlling the power transistors T1 and T3 at high levels, and keeping the PWM signals for controlling the power transistors T2 and T4 at low levels when the first reference waveform is located in the unipolar half cycle and the power transistors T1, T2, T3 and T4 are all in the non-PWM time periods.

5. The PWM method according to claim 1, wherein the PWM signals generated by different carrier signals in the n carrier signals are used in turn to preform PWM on each of the n Cascaded H-bridge rectifier circuits.

6. The PWM method according to claim 1, wherein each power transistor is an N-channel Metal-Oxide-Semiconductor Field-Effect Transistor (MOSFET) or an Insulated Gate Bipolar Transistor (IGBT) connected in inverse parallel with diodes.

7. The PWM method according to claim 6, wherein the PWM signals generated by different carrier signals in the n carrier signals with the highest level are used in turn to preform PWM on each of the n H-bridge rectifier circuits.

8. The PWM method according to claim 1, wherein each phase of the CHB converter is provided with n+m CHB rectifier circuits, the n CHB rectifier circuits are used for rectification, and the m CHB rectifier circuits are used as redundancy levels, where m is greater than 1; and
n+m carrier signals having successively decreasing levels and equal amplitudes are generated for each phase, wherein the n carrier signals with the highest levels correspond to the n CHB rectifier circuits respectively, and the levels of the n+m carrier signals are cascaded to fill the voltage amplitude throughout the cycle of the reference waveform.

9. The PWM method according to claim 8, wherein the levels of the n+m carrier signals are cascaded to fill the voltage amplitude of the unipolar half cycle of the reference waveform in the S1.

10. The PWM method according to claim 1, wherein a by-pass switch is provided between the first AC input terminal and the second AC input terminal of each CHB rectifier circuit.

11. The PWM method according to claim 10, wherein each by-pass switch is a TRIAC, and the PWM method further comprises a step of:
when the power transistors T1, T2, T3 and T4 of at least one of the CHB rectifier circuits are in the non-PWM time periods at the same time, and the alternating currents flowing through the power transistors T2 and T4 are in time periods during which the amplitude monotonically decreases to cross zero, controlling the TRIAC of each CHB rectifier circuit to be switched on to bypass the CHB rectifier circuit.

12. The PWM method according to claim 10, wherein the by-pass switches are two IGBTs connected in inverse parallel, and the PWM method further comprises a step of:
when the power transistors T1, T2, T3 and T4 of at least one of the H-bridge rectifier circuits are in the non-PWM time periods at the same time, controlling the two IGBTs connected in inverse parallel to be switched on to bypass the H-bridge rectifier circuit.

13. A Cascaded H-bridge (CHB) converter for connection to a three-phase AC power supply, each phase of the CHB converter being provided with n Cascaded H-bridge rectifier circuits, and DC/DC converter circuits and DC/AC inverters corresponding to outputs of each H-bridge rectifier circuit, wherein each H-bridge rectifier circuit is provided with a first AC input terminal, a second AC input terminal, a positive DC output terminal and a negative DC output terminal, four power transistors connected to form a H-bridge structure, and a DC bus capacitor, and
wherein the CHB converter further comprises a control module which controls the power transistors of at least one of the H-bridge rectifier circuits to switch on and off by the PWM method according to claim 1.

14. The CHB converter according to claim 13, wherein:
an input terminal of each DC/DC converter is connected to the positive DC output terminal and the negative DC output terminal of each H-bridge rectifier circuit, and each DC/DC converter is an isolated DC/DC circuit that comprises a primary side and a secondary side of DC converters isolated by a transformer.

\* \* \* \* \*